United States Patent [19]

Poissant et al.

[11] Patent Number: 5,571,029
[45] Date of Patent: Nov. 5, 1996

[54] INSULATION DISPLACEMENT CONNECTOR

[75] Inventors: Serge Poissant, St. Philippe; Claude Pelletier, Laval; Gaetan Dube, Montreal; Gilles Hurtubise, Vaudreuil; Roger L. Paradis, Longueuil; David Pepler, Pierrefonds, all of Canada

[73] Assignee: Siecor Corporation, Hickory, N.C.

[21] Appl. No.: 347,240

[22] Filed: Nov. 23, 1994

[51] Int. Cl.⁶ .................................................. H01R 4/24
[52] U.S. Cl. .......................................... 439/412; 439/418
[58] Field of Search .................................... 439/411, 412, 439/709, 710, 711, 417, 418, 922, 621, 622; 174/51

[56] References Cited

U.S. PATENT DOCUMENTS

| | | | |
|---|---|---|---|
| 4,652,071 | 3/1987 | Debortoli et al. | 439/412 |
| 4,741,480 | 5/1988 | Despault et al. | 439/412 |
| 4,826,449 | 5/1989 | Debortoli et al. | 439/411 |
| 4,988,311 | 1/1991 | Tanzola | 439/411 |
| 4,993,966 | 2/1991 | Levy | 439/411 |
| 5,296,646 | 3/1994 | Capper et al. | 174/51 |
| 5,423,694 | 6/1995 | Jensen et al. | 439/411 |

Primary Examiner—David L. Pirlot
Assistant Examiner—Brian J. Biggi
Attorney, Agent, or Firm—Wesley T. Noah

[57] ABSTRACT

An insulation displacement connector is provided that has two housings. The first housing encloses surge protection. Terminals extend from the first housing. The second housing has insulation displacement terminals with first ends for connection with insulated wires and with second ends for connection to the terminals extending from the first housing. The two housings are to be joined together to complete an electrical line from one insulation displacement terminal to the other via the surge protection. Thus, surge protection is in one sub assembly protected from the environment, and the insulation displacement terminals are in another subassembly protected from the environment. The housings have a detent assembled condition enabling relative positional adjustment before joining of the housings. Electrical testing for the line circuit and for the surge protection may be performed upon the closed assembly.

13 Claims, 6 Drawing Sheets

INSULATION DISPLACEMENT CONNECTOR

BACKGROUND OF THE INVENTION

This invention relates to insulation displacement connectors.

Insulation displacement connectors are known in which two conductor wires are connected together in an insulating housing structure by the use of conductors having insulation displacing terminals at one or each end. In such structures, there may normally be a housing and a cap is screwed down into the housing to connect one or both of the insulation displacement terminals to an individual conductor wire so as to connect, for instance, a customer's service to a central office. The cap is normally provided with a pair of wires aligned with one of the invention displacement terminals and the other insulation displacement terminal is aligned with another pair of wires. Examples of known structures of this type are described in U.S. Pat. No. 4,652,071 granted Mar. 24, 1987 in the name of G. Debortoli, et al and U.S. Pat. No. 4,741,480 in the name of P. Despault, et al granted May 3, 1988.

In use of this type of structure, overvoltage and overcurrent protection is also provided by surge devices which are placed electrically in series with the insulation displacement connector. Problems are inherent with such an arrangement in that the overvoltage and overcurrent protection devices are connected to conductor wiring by binding posts which are extremely difficult to protect from the environment and corrosion of the binding post terminations may result. This may lead to breakages in electrical connection through the overvoltage and overcurrent protection devices which is a well known phenomenon.

The present invention seeks to minimize or avoid the above problem.

SUMMARY OF THE INVENTION

According to the invention, an insulation displacement connector for at least one circuit line comprises first housing means sealingly enclosing an electrical surge protection means which is connected at one side to ground means and at the other side to first conductor means of the circuit line, the first conductor means having two terminals extending externally from the first housing means, a second housing means movable into a closed condition with the first housing means, second and third conductor means located within the second housing means and each having at one end an insulation displacement terminal for connection to an insulated conductor wire and having at the other end another terminal which connects to an individual of the terminals of the first conductor means with the two housing means closed together, the second housing means comprising means for aligning a conductor wire with each of the insulation displacement terminals and for connecting the conductor wires to the insulation displacement terminals.

With the above structure according to the invention the electrical surge protection means is provided in the connector instead of being connected serially with it. In the structure, electrical connection is in series through the second conductor means through the first conductor means and then through the third conductor means with the electrical surge protection means connected to ground and connected to the first conductor means. The construction is such that the mating terminals of the two housing means are brought together during closing together of the housing means such that connections like binding posts which are normally provided for connection of the wiring to protection means is avoided. One of the terminals of one of the housing means is conveniently a blade terminal while the other terminal of the housing means is conveniently a resilient fork for resiliently receiving an individual blade terminal as the housing means move into the closed condition. In addition to this, the sealing of the protection means within the first housing means ensures that no corrosion within the first housing means can take place thereby avoiding electrical shorts leading therefrom. Further to this, with this construction according to the invention, in practice a gel or a grease is conveniently used between the two housing means so that a seal is provided between them as they are moved into the closed condition thereby protecting the connection of the terminals extending between the housing means from ambient atmospheric conditions.

In a preferred arrangement the connector is constructed to accommodate two circuit lines, e.g. a "tip" and "ring" line. Each line has its own second and third conductor means so that four insulation displacement terminals are provided. Also four other terminals are provided for connection to two first conductor means each having two terminals extending externally from the first housing means. The two first conductor means are electrically isolated from one another and each first conductor means has its own electrical surge protection device. In a practical arrangement, each of the first housing means is provided with two chambers each housing an individual protection device with the terminals of each of the first conductor means sealingly extending through one wall of the first housing means with the ground means located on an opposite wall of the first housing means.

One of the preferred intentions of the invention is that each of the second housing means is locatable in a detent position upon the first housing means preparatory for the second housing means to be moved into the closed position upon installation. In the detent position, it is preferable for the second housing means to be completely detachable from the first housing means so that it may be reversed in position. This enables inlets to passages for incoming conductor wires to be disposed in one of two preferred positions dependent upon the site conditions in which the connector is to be used. Also, with the second housing means in the detent position, the connector is in readiness for insertion of connector wires into the second housing means so that the closed condition may then be attained at which time electrical connection takes place through the connector. It is also to be preferred that the two housing means when in the closed condition cannot be separated from one another so that the protection means and the terminal connections to the protection are permanently protected.

BRIEF DESCRIPTION OF THE DRAWINGS

One embodiment of the invention will now be described, by way of example, with reference to the accompanying drawings, in which.

DESCRIPTION OF THE PREFERRED EMBODIMENT(S)

Figure 1:
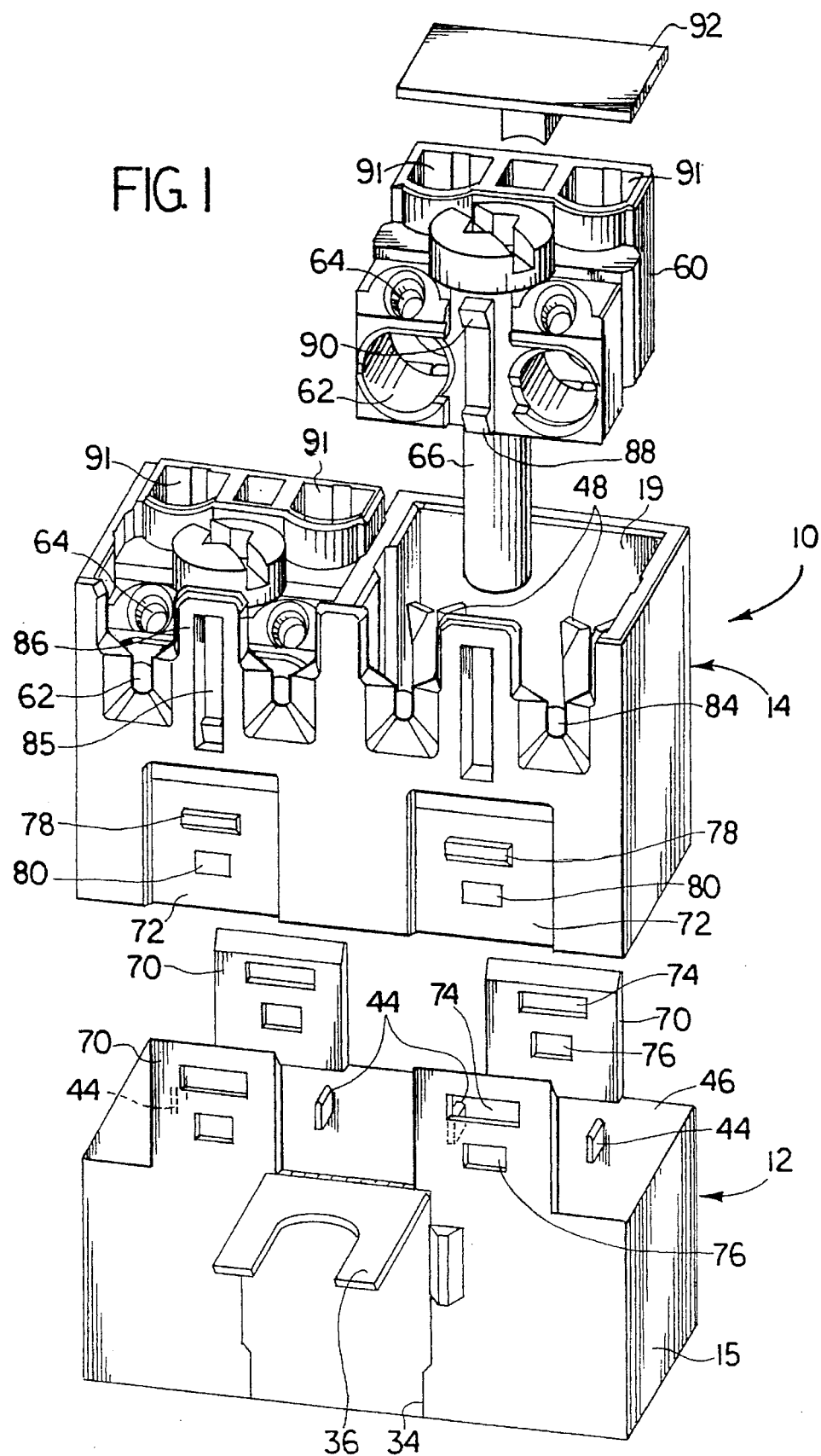
FIG. 1 is an exploded isometric view of an insulation displacemet connector according to the embodiment.
Figure 2:
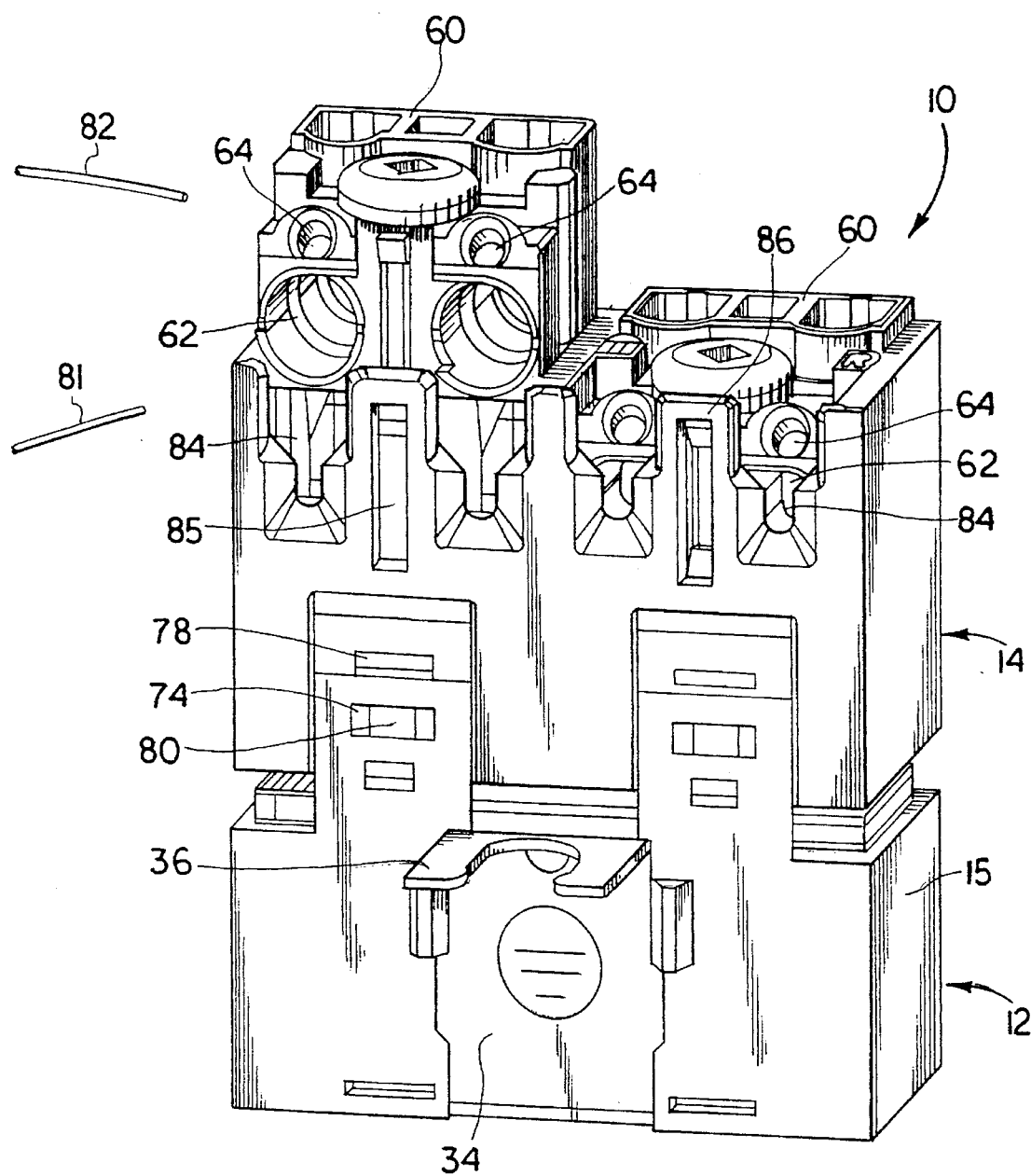
FIG. 2 is an isometric view of the connector with one housing means in a detent position upon another housing means.
Figure 3:
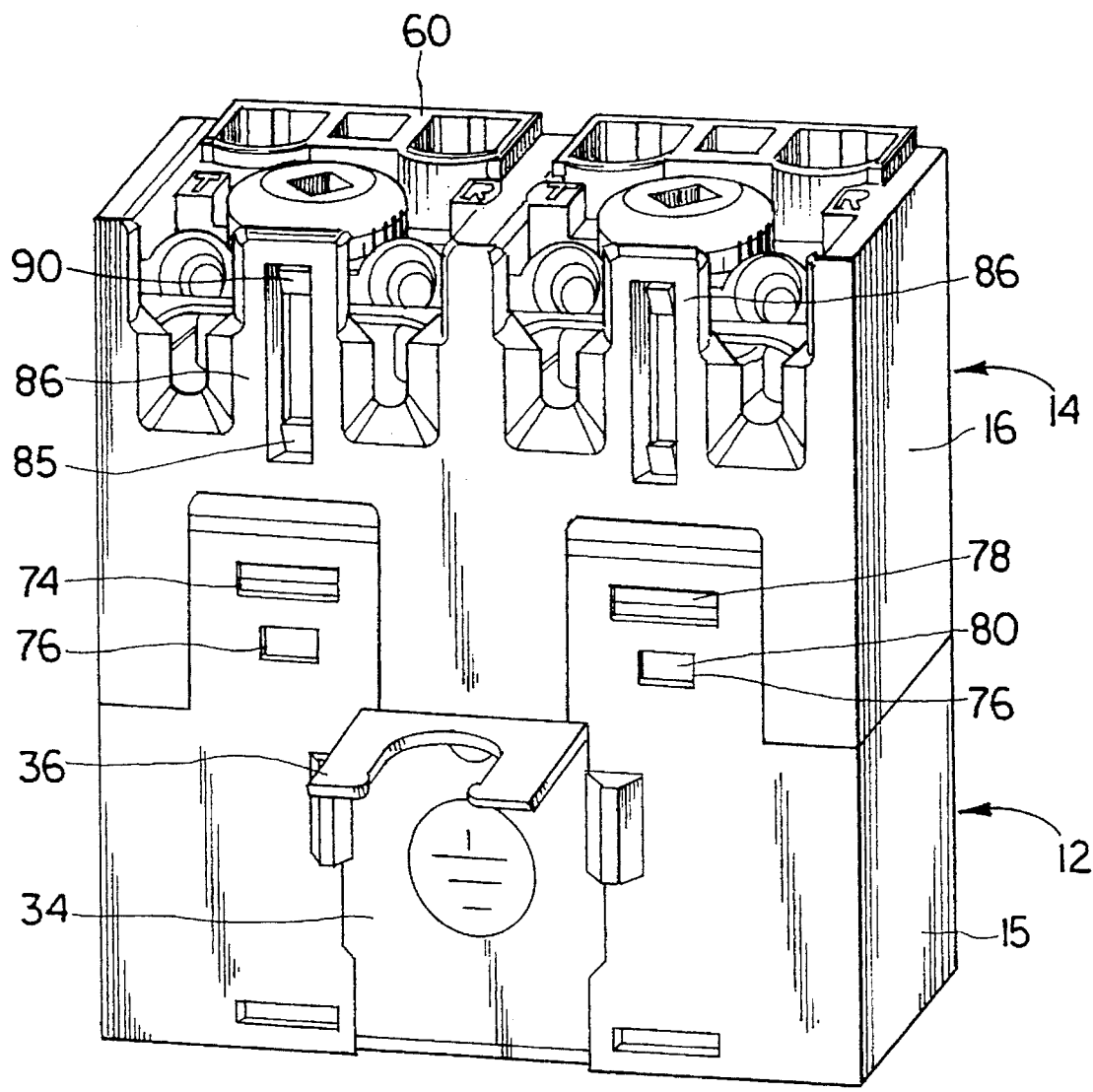
FIG. 3 is a view similar to FIG. 2 showing the two housing means in completely closed conditions.
Figure 4:
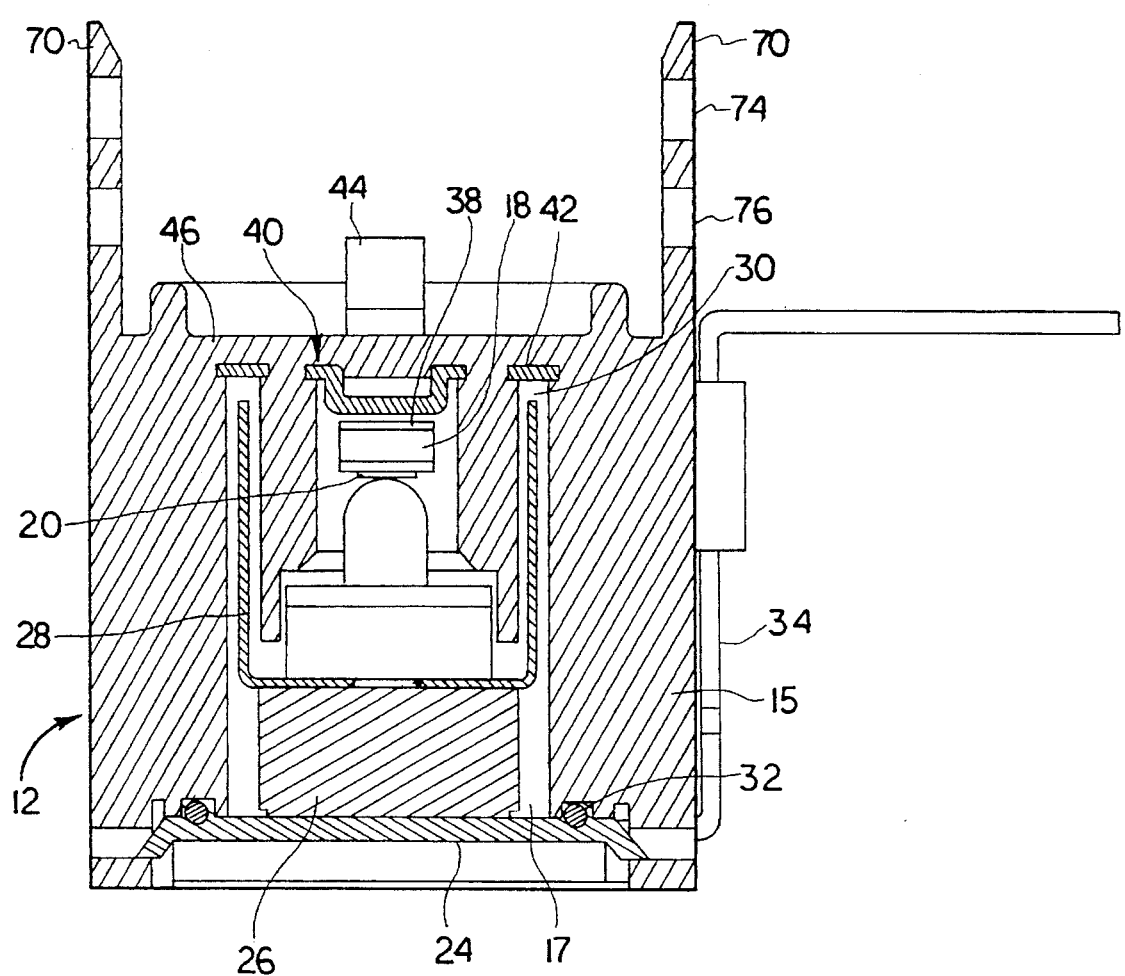
FIG. 4 a cross-sectional view and to larger scale of one of the housing means taken along line IV—IV in FIG. 1.

In the embodiment, as shown by FIGS. 1, 2 and 3, an insulation displacement connector 10 comprises a first housing means in the form of a lower housing 12 and a second housing means 14. The first housing means is in the form of a molded insulating box 15 which has two spaced chambers 17 (FIG. 4) each chamber individually housing an electrical surge protection means in the form of a separate overvoltage and overcurrent protection device 18 which is of solid state construction. One chamber 17 only is shown in the drawings. As shown by FIG. 4, a lower electrode 20 of the device is connected by conductors 22 to a ground means through a conductive spring 26 and a conductive cup 28 which is slidably received within a cylindrical formation 30 of the chamber 17. The ground means comprises a flat plate 24 with flanged edges as shown in FIG. 4 and this flat plate extends beneath the housing 12 to close a lower opening of each chamber 17, a seal being provided in the form of a gasket 32 received in a groove of the housing 12 to seal the ground plate in position and protect the chamber 17 and its contents from ambient atmospheric conditions. As shown in FIGS. 1, 2, 3 and 4, the ground means also includes a flange 34 extending from the plate 24 upwardly around one side of the housing 12 the flange extending horizontally outwards as a slotted end 36 for connection to a suitable ground pin.

Figure 6:
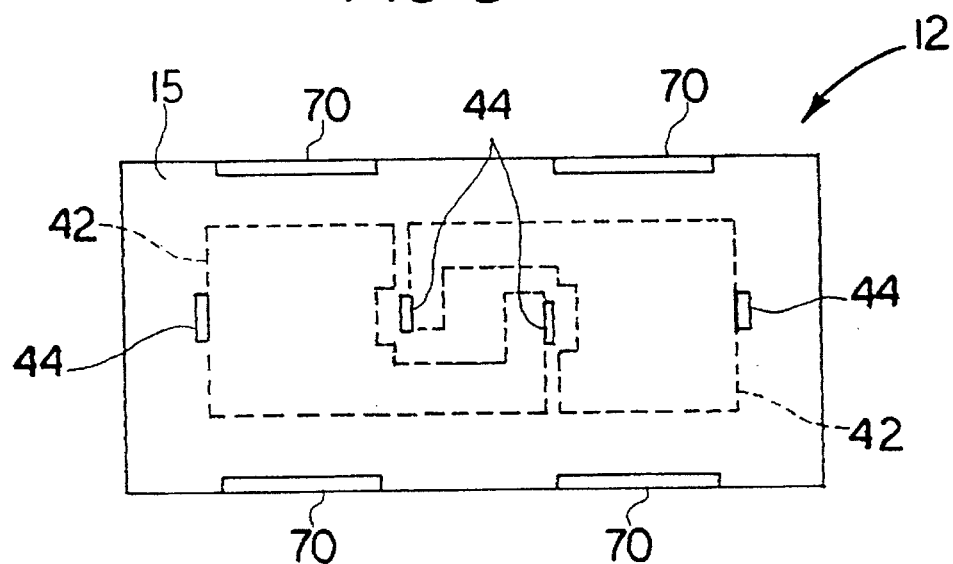
FIG. 6 is a plan view of one of the housing means and in the direction of arrow VI in FIG. 1 to show the positions of conductor means within that housing means.

The upper electrode 38 of each device 18 is individually connected to its own conductor means 40 molded within the housing. Each of the conductor means 40 as shown by FIG. 6 comprises a pressed conductive metal plate 42, two plates being formed so as to interfit with each other while being spaced apart as shown by FIG. 6 and also with each plate providing two upwardly extending blade terminals 44, the disposition being such that the blade terminals 44 are retained in straight-line equally spaced-apart positions by the housing. The relative positions of the terminals are shown particularly in FIGS. 1 and 6 and as may be seen, each of the terminals projects upwardly from an upper wall 46 of the housing 12. Upon failure of the device 18, the conductive cup 28 is pushed upwards by the spring 26 so that the rim of the cup provides a permanent ground against the underside of the associated plate 42.

Figure 5:
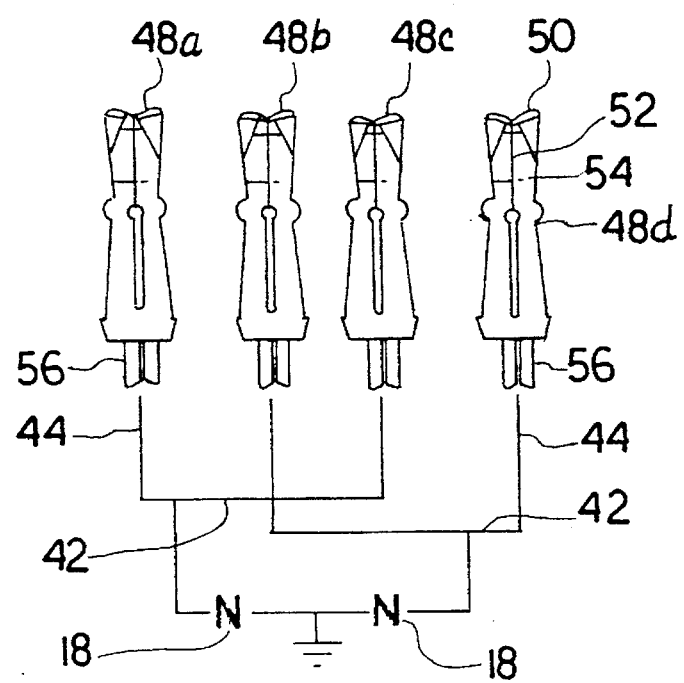
FIG. 5 is a part diagrammatic isometric view showing four conductors of one of the housing means and illustrating the electrical connection through the connector with the two housing means in closed condition.

The upper housing means 14 comprises a molded insulating box 16 formed with two spaced vertically extending cavities 19, each open at its top. Within each of the cavities 19 two conductors are retained in position within the box as illustrated by conductors 48 for instance in FIG. 1. Each conductor 48 as shown by FIG. 5 is upwardly elongate and has an upper end with inwardly inclined edges 50 for the purpose of guiding an insulated conductor wire into an insulation displacement terminal 52 formed between opposed edges of an upwardly extending fork 54 of the conductor 48. At its lower end, each conductor 48 is provided with a fork terminal 56 for connection with an individual one of the terminals 44 when the housings 12 and 14 are assembled together in a closed condition as will be described. In general therefore each of the conductors 48 is located in the box 16 in a manner similar to that described in U.S. Pat. No. 4,652,071, a main difference being that the terminals 56 project outwardly below the box 16 for connection to the terminals 44 as distinct from the location of lower terminals in U.S. Pat. No. 4,652,071 which were contained within the housing itself.

The upper housing means also is provided with means for aligning a conductor wire with each of the insulation displacement terminals 52 and for connecting the conductor wires to each of these terminals. This aligning and connecting means comprises two caps 60 (FIGS. 1, 2 and 3), each cap for vertical movement into and out of an individual vertical cavity 19. Each of the caps is provided with two large diameter inlets 62 for large diameter wires and small diameter inlets 64 which are inclined downwardly for small diameter wires, the construction of each of the caps 60 with its passages 62 and 64 being as described in U.S. Pat. No. 4,741,480. As described in that patent the smaller diameter passages 64 are provided for ensuring positive connection of small diameter wires with each of the insulation displacement terminals 52 without the wires becoming bent during the assembly process. Also as described in the above-mentioned previous patents, a screw-threaded means is provided for screwing each of the caps 60 into and out of an operating position within its cavity 19. This screw-threaded means comprises a screw 66 extending through its individual cap, the screw received within a screw-threaded hole (not shown) towards the bottom of the box 16.

It is intended that the box 16 should be assembled to the housing 12 in two alternative different positions. For this purpose the housing 12 has two molded upward extensions 70 on each side of the housing, each of the extensions 70 being resiliently flexible in an outward direction and being receivable within a corresponding shallow recess 72 in a side of the box 16. As will be seen, each of the extensions 70 is formed with two horizontal slots 74 and 76 (although the lower slot 76 in each case need only be a recess in the inside wall of each extension 70). Within each of the shallow recesses 72 two horizontal projections, or ribs, 78 and 80 are provided. As shown by FIG. 2, in the detent position of the box 16 upon the housing 12 each of the lower projections or ribs 80 is received in an individual upper slot 74 so that the box 16 has a lower surface spaced away from the housing 12. In the detent position, the terminals 44 are spaced from and therefore disconnected from the lower fork terminals 56 of the conductors 48. Also, with the box 16 in the detent position it is possible for the extensions 70 to be flexibly moved apart by an upward pull on the box 16 to enable the box to be turned around 180° horizontally upon the housing 12 so as to position the inlets 62 and 64 to face in the opposite direction from the housing 12 from that shown in the Figures. This is particularly useful under certain conditions where it is difficult to connect the slotted end 36 of the ground plate to a ground pin and also have the connector wires extending into the connector from the same side.

FIG. 3 shows the lower or closed condition of the box 16 upon the housing 12. In this condition, each of the ribs 78 is received in a slot 74 and each rib 80 is received within a slot 76 or in its alternative recess as discussed above. This movement into the closed position is irreversible as one or both of the ribs 78 and 80 lock against complementary surfaces of the respective slots so that the assembly is permanently maintained.

As will be seen however, the extensions 70 are exposed in the closed position of FIG. 3. The extensions 70 while being resiliently flexible are also frangible. In the event that either of the protection devices 18 fails and permanently connects a circuit line to ground, sufficient of the extensions 70 may be broken away to allow for removal of the box 16 from the housing 12. The box 16 thus remains undamaged and a replacement housing 12 with its components in working order may be connected to box 16. With this replacement method, the wires 81 or 82 remain connected into the insulation displacement terminals 52.

In use of the connector, initially the parts are as shown in FIG. 1 and to completely seal each of the chambers 17 from ambient atmosphere, a suitable sealing grease or gel is positioned around lower ends of the terminals 44 projecting through the upper wall 46 so as to seal any space at that position. The connector is conveniently sold with the box 16 in the detent position upon the housing 12 as shown in FIG. 2. An installer may then position the box 16 in either of the two positions convenient to him and as discussed above. To make electrical contact through the connector, it is necessary for each of the caps 60 to be in an upper position (left-hand side of FIG. 2 as distinct from its operational position—right-hand side of FIG. 2). In the upper position of each of the caps 60, large diameter conductor wires 81 or alternatively small diameter conductor wires 82 as illustrated in FIG. 2 are passed as desired through the appropriate inlets 62 or 64 in each of the caps 60, the passages having previously been filled with a sealing substance such as a suitable grease or gel for sealing purposes. Each of the caps is then screwed downwards into the box 16 and into its operating position as shown on the right-hand side of FIG. 2. For accommodating the wires 81, downward slots 84 are provided in the box 16 to align with the inlets 62 as shown. As each of the caps 60 moves into its operational position the wires 80 or 82 are aligned with the insulation displacement terminals 52 and as downward movement continues by the cap, the wires are contacted by the insulation displacement terminals 52, the wires moving into the terminals which cut into the insulation and make electrical contact with the conductors inside. Upon this connection having been made, the box 16 may then be pushed downwardly from the detent position into the fully closed position upon the housing 12 in which it is permanently fixed so as to fully protect the interconnection which is then made between the blade terminals 44 and the fork terminals 56 of the conductors 48. During this movement into the fully closed position, any grease or gel surrounding the blade terminals 44 is pressed outwardly across the upper surface of the upper wall 46 so as to form an effective seal between the two housing means.

In an alternative method of assembly, the box 16 is pushed downwards into its fully closed position on the housing 12 before the caps 60 are moved downwards with the conductor wires for connection to the insulation displacement terminals 52.

To prevent overstressing the housing 14 and the caps 60, means is provided for providing an audible signal which indicates when each cap 60 is in its completely assembled position within its respective cavity 19. With regard to each of the cavities 19, the means for making the audible signal comprises a resiliently flexible flap 86 which extends upwardly between the slots 84 and has a vertical slot 85. The cap 60 is provided with a lower projection 88 for receiving in the slot 86, the projection 88 moving vertically in its respective slot 85 during movement of the cap into and out of its assembled position for the purpose of retaining the cap in the housing 14 when the cap is in its fully raised position. In addition, the cap 60 is provided with a further projection 90 vertically above the projection 88. With the cap in its upper position as shown by FIG. 2, the projection 90 is disposed above its corresponding flap 86. As the cap 60 is moved downwardly to its lower position (right-hand side of FIG. 2) the projection 90 moves downwardly and an inclined front surface of the projection 90 acts against the flap 86 so as to resiliently urge the flap outwards to enable the projection to slide past the top of the flap to be eventually received within a slot 85. Upon the projection 90 being received in its slot 85, the upper end of the projection has a horizontal surface as shown and this enables the flap to return resiliently and suddenly so that the free end of the flap hits against the cap 60 thereby causing an audible sound which occurs when the cap 60 is in its most downward and operative position.

The connector conveniently provides a single unit in which wire connections are housed in the connector and in which the overvoltage and overcurrent devices 18 are provided and are effectively sealed against ambient atmospheric conditions. It also provides a device in which, because of the location of the devices 18 in the unit, and also because of the use of the two caps 60, may be tested for any possible fault as will now be explained. With the connector wired correctly, the two wires 81 or 82 entering into the one cap 60 should be from the central office location while the other two wires 81 or 82 entering the other cap 60 should be the wiring to the customer's premises. Thus, with reference to FIG. 5 which shows the electrical connections through the connector in the final closed condition, the conductors 48*a* and 48*b* have their insulation displacement terminals 52 connected to wires 81 or 82 from the central office whereas the terminals 52 of the conductors 48*c* and 48*d* are connected through conductor wires to the customer's premises. The conductors 48*a* and 48*b* are housed in one of the cavities 19 whereas the conductors 48*c* and 48*d* are housed in the other cavity 19. As may be seen therefore from the diagrammatic representation of FIG. 5, conductor 48*a* is connected through its individual blade terminal 44, through the corresponding conductor plate 42 and then into the conductor 48*c* through the other blade terminal 44 of that particular conductor means 40. In similar fashion the conductor 48*b* is connected to the conductor 48*d* through their respective blade terminals 44 and the plate 42 of the other conductor means 40. As also shown diagrammatically by FIG. 5, the two devices 18 are connected between their respective conductor plates 42 and ground. As may be seen from FIGS. 1, 2 and 3 particularly, each of the caps 60 is provided with two vertical ports 91 for test purposes, these ports extending downwardly for location of test probes into contact with respective conductors 48*a* to 48*d*. Test ports 91 are normally conveniently covered with covers 92 which are manually pressed into position and may be manually released for test purposes.

Hence, with the cap 60 associated with the central office conductors 48*a* and 48*b* raised to its upper position, this disconnects the central office wires from the connector because the blade terminals 44 are disconnected from the four fork terminals 56 of the conductors 48*a* and 48*b*. Test probes may then be inserted into the appropriate test ports 91 for testing the customer's circuit which is still connected to the connector by means of the conductors 48*c* and 48*d*. Alternatively, the other cap associated with conductors 48*c* and 48*d* may be raised thereby severing connection to the customer's wiring. In this condition probes may be appropriately inserted into the ports 91 for testing the central office circuit which is still connected to the connector by the conductors 48*a* and 48*b*. As a further alternative, with both caps 60 raised plugs may be connected to the blade terminals 44 for the purpose of testing the overvoltage and overcurrent protection to ground through the devices 18 or for testing through the conductor plates 42 to ascertain whether a desired circuit is completed from side-to-side of the housing 12 without any short occurring through the insulating material of the housing from one plate to another. As may be seen therefore not only does the assembly of the connector provide for complete sealing action for the terminals and overvoltage and overcurrent device in one unit, but it also enables a complete electrical circuitry test operation to be completed.

Figure 7:
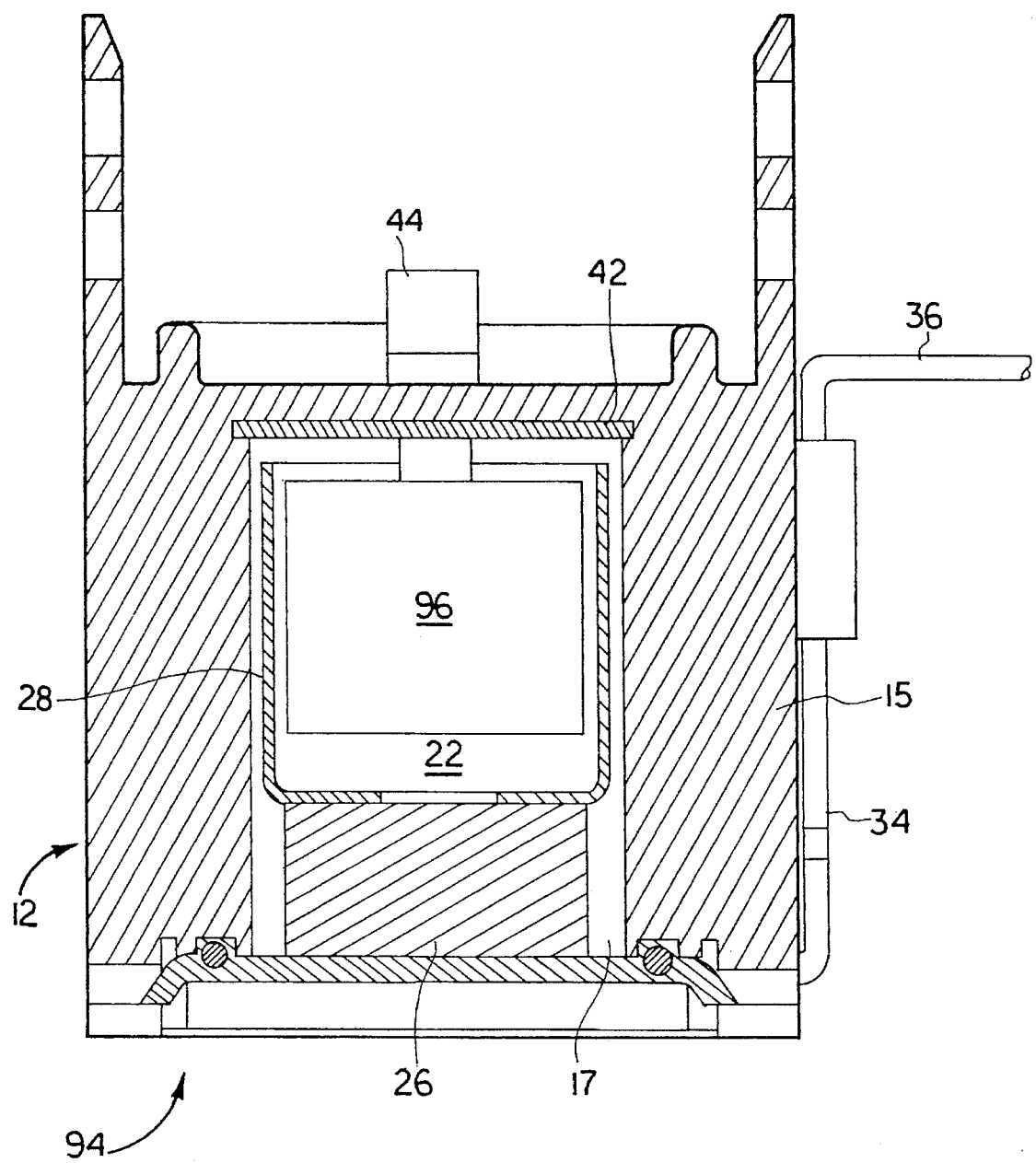
FIG. 7 is a view similar to FIG. 4 of a modification to the embodiment.

In a modification to the embodiment described above in which like parts bear the same reference numerals, an insulation displacement connector 94 (FIG. 7) which is otherwise similar to the connector 10 described in the first embodiment, the overvoltage and overcurrent protection means is provided by two gas tubes 96 of conventional construction, instead of by the solid state devices 18 shown. Only one of the devices 96 is illustrated in FIG. 7. As with the embodiment, a conductive cup 28 is provided for connection to each of the plates 42 upon failure of the gas tube for permanent connection of one or both lines to ground.

What is claimed is:

1. An insulation displacement connector for at least one circuit lines comprising first housing means sealingly enclosing an electrical surge protection means which is connected at one side to ground means and on the other side to first conductor means of the circuit line, the first conductor means having two terminals extending externally of the first housing means, a second housing means movable into a closed condition with the first housing means, second and third conductor means located within the second housing means and each having at one end an insulation displacement terminal for connection to an insulated conductor wire and having at the other end another terminal which connects to an individual one of the terminals of the first conductor means with the two housing means closed together, the second housing means comprising a means for aligning a conductor wire with each of the insulation displacement terminals and for connecting the conductor wires to the insulation displacement terminals.

2. A connector according to claim 1 wherein in respect of each terminal of the first conductor means and its associated terminal at the other end of the second or third conductor means, one of these terminals is a blade terminal and the other terminal is a fork terminal for receiving and being connected to its respective blade terminal.

3. A connector according to claim 1 provided with means to locate the second housing means in a detent position mounted upon the first housing means in which the second housing means is spaced from its closed position upon the first housing means, the second housing means in the detent position being removable from the first housing means and being reversible in its position upon the first housing means.

4. A connector according to claim 3 wherein, when the two housing means are in their closed positions, they are permanently secured together.

5. A connector according to claim 4 wherein the first housing means comprises a frangible securing element cooperable with the second housing means to permanently secure the housing means together, the securing element being accessible in the permanently secured state of the housing means to enable the securing element to be broken to allow for separation of the housing means with the second housing means remaining undamaged.

6. A connector according to claim 1 provided with two circuit paths, the first housing means sealingly enclosing a separate electrical surge protection means for each path, each surge protection means connected at one side to ground means and at the other side to first conductor means of its respective circuit path, and in respect of each circuit path, a first conductor means having two terminals extending exteriorly of the first housing means for connection to second and third conductor means of the respective circuit path housed within the second housing means.

7. A connector according to claim 6 wherein, in respect of each second housing means, the means for aligning and connecting conductor wires to the insulation displacement terminals comprises two caps each having a screw-threaded control for screwing the cap individually into and out of an operative position within the second housing means, each cap having an alignment passage for aligning a conductor wire with each of corresponding insulation displacement terminals of second and third conductor means for electrically connecting each of the wires with its respective insulation displacement terminal as the cap is moved into its operative position, and each cap carries one conductor of each circuit path.

8. A connector according to claim 7 wherein each cap is provided with two test ports for insertion of test probes into contact with conductor means of the connector for circuit testing purposes.

9. A connector according to claim 6 wherein, in respect of each terminal of the first conductor means and its associated terminal at the other end of the second and third conductor means, one of these terminals is a blade terminal and the other terminal is a fork terminal for receiving the blade terminal in electrical contact.

10. A connector according to claim 6 provided with means to locate the second housing means in a detent position mounted upon the first housing means in which the second housing means is spaced from its closed position upon the first housing means, the second housing means in the detent position being removable from the first housing means and being reversible in its position upon the first housing means.

11. A connector according to claim 10 wherein when the two housing means are in their closed positions together, they are permanently secured together.

12. A connector according to claim 7 wherein each cap has a projection and its housing has a resiliently flexible flap with a slot for receiving the projection with the cap in the operative position, the flap being flexed as the cap moves into the operative position and upon the projection entering the slot, the flap resiliently returns to a normal position to produce an audible signal indicating that the cap is in the operative position.

13. A connector according to claim 6 wherein the first housing means is formed with two chambers each housing an individual electrical surge protection means with the two terminals of each first conductor means sealingly extending through one wall of the first housing means and the ground means is located at an opposite wall of the housing means and sealingly covers entrances to the two chambers.

* * * * *